3,527,690
DEPOLARIZING CATHODES
Marc Griffon du Bellay, Saint-Genis-Laval, and Roland Bachelard, Lyon, France, assignors to Ugine Kuhlmann, Paris, France, a French company
Filed Aug. 15, 1966, Ser. No. 572,374
Claims priority, application France, Aug. 16, 1965, 28,410
Int. Cl. B01k 3/04
U.S. Cl. 204—284
5 Claims

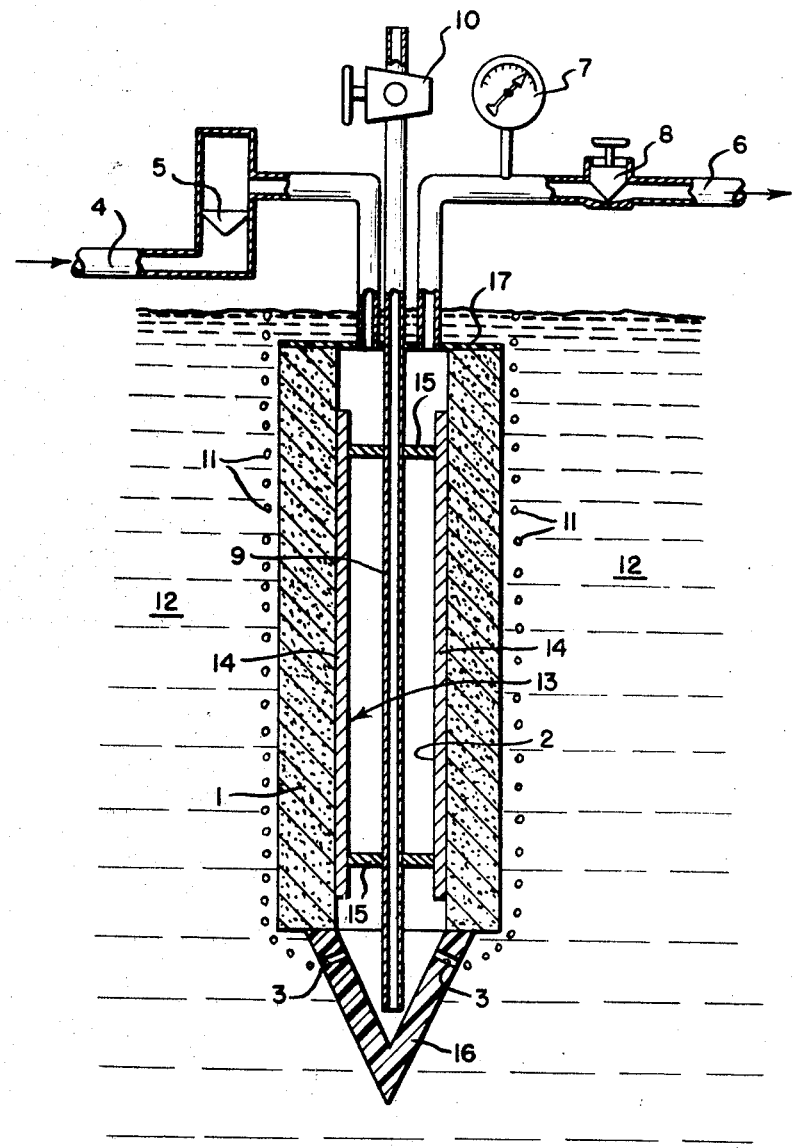

ABSTRACT OF THE DISCLOSURE

A depolarizing cathode in the form of a vertical cylinder of porous conducting material, closed at the top and closed at the bottom except for apertures at the bottom through which bubbles of gas may pass to the exterior of the electrode. Inlet and outlet gas conduits and a conduit for the supply and withdrawal of liquid lead to the interior of the electrode.

---

The present invention relates to cathodes for use in aqueous electrolytic solutions.

In certain processes of electrolysis in solution there occurs a phenomenon of polarization of the electrodes which represents a non-negligible loss of energy. This is the more undesirable in consequence of the fact that this energy, when liberated at the cathode, is often expended in an evolution of hydrogen which is sometimes very difficult economically to recover or exploit. In order to limit or reduce this energy loss it has been proposed to utilize porous cathodes depolarized by means of oxygen. These known cathodes are made up of porous elements having catalytic properties and to the interior of which there is fed oxygen or a gas containing oxygen, the gas diffusing out through the electrode due to the porous structure of the latter. The evolution of hydrogen is thus suppressed.

This construction, derived from that of fuel cells, makes it possible to save part of the energy otherwise expended in the evolution of hydrogen. Difficulties are however encountered in employing these prior art cathodes in large-scale operations because of the dimensions of the electrodes required. There are substantial dangers that the porous cathode will be "drowned" in that the liquid of the electrolyte may penetrate into the interior of the cathode through the porous walls. Moreover, when the electrode is vertically oriented, as is usually the case, the functioning of the electrolyser varies with level or depth in the electrolyte.

The present invention provides a cathode construction improving the functioning of electrolysers equipped with porous cathodes.

More particularly, the invention pertains to an improvement in vertical porous depolarizing cathodes operating by means of an oxygen-containing gas such as air or any other combustion-supporting gas, and to the use of such cathodes in aqueous electrolytic cells, particularly those used in the manufacture of alkaline chlorates.

A cathode according to the invention comprises at the lower portion thereof, preferably below the lower limit of its active surface, calibrated holes which are regularly disposed and through which bubbles of a depolarizing gas supplied to the interior of the cathode may escape to the exterior thereof. The invention may be embodied in vertical cylindrical electrodes operating effectively on their whole exterior surface, the holes then being disposed around the entire periphery of the cathode at the base thereof. It may also be embodied in electrodes of parallelopiped shape comprising pairs of plane faces joined together in a liquid-tight manner at the dihedrals of those faces. In such a construction the holes are disposed at the same vertical level on all of the faces.

The interior space or cavity of the electrode connects to an upper escape line for gas having a valve and a pressure-measuring device for control of gas pressure. Control of the air or other oxygen-containing gas entering the electrode and of that emerging throug hthe upper exit therefrom combined with the calibrated sizing of the holes makes it possible to control the pressure of that gas opposed through the pores of the electrode to the pressure of the electrolyte and the quantity of that gas passing up through the electrolyte bath outside the electrode, i.e. between opposite electrodes in a bath containing a plurality thereof.

The invention will now be described in further detail in terms of an exemplary non-limitative embodiment thereof and with reference to the accompanying drawings, wherein the single figure of drawing is a schematic vertical axial sectional view of one form of cathode according to the invention.

In that figure the depolarizing cathode comprises a plurality of porous plates 1. These are supported on a framework generally indicated at 13, to define a generally tubular or cylindrical structure (which may however be of polygonal or other non-circular cross-section). The cathode thus possesses a central cavity 2, extending over the full height thereof. The plates are joined at their contiguous edges, in a manner incompletely shown in the drawing, so that the tubular or cylindrical structure formed by the plates is water-tight except for the porosity of the plates. The height of the electrode, as well as its peripheral dimension, may require the joining together of a plurality of plates edge-to-edge. The framework 13 may be of any suitable construction which leaves all or most of the inner surface of the plates exposed to the gas pressure existing in the cavity 2. The drawing shows the frame as including vertical members 14 joined by horizontal struts 15. It is to be understood of course that the struts 15 do not prevent the flow of gas throughout the vertical length of the cavity 2. The framework 13 may advantageously be covered with a coating of insulating resin.

Below the cavity 2 there is fastened to the plates a cap 16 which closes the lower end of the hollow electrode to the exterior, except for a series of holes 3 passing through the cap and disposed about the periphery of the electrode. The diameter of the holes 3 depends on the dimensions of the pores of the electrode; for instance, for dimensions of pores comprised between 0.002 and 0.01 mm., the holes 3 may be of 0.1 mm. diameter. They may be spaced from 5 to 10 cm. apart.

The electrode is closed at its upper end by means of a cap 17, which may be flat. The caps 16 and 17 may be made of any suitable material; the cap 17 is generally conducting.

The means for maintaining and controlling gas pressure within the cathode of the drawing comprise a supply line 4 and an outlet line 6, both passing through the cap 17. A flow-measuring device 5 is inserted into the supply line 4 while the outlet line 6 includes an adjusting valve 8 and has a pressure measuring device 7 connected thereto.

A further line 9, having a valve 10, passes through cap 17 to permit supply of water to the cavity for cleaning purposes, and also to permit the withdrawal of liquid from the cavity. The air passing out through the holes 3 in lower cap 16 forms bubbles as shown at 11. In rising to the surface of the electrolyte, these bubbles effect a mixing and homogenization of the electrolyte.

One of the advantages of the cathode of the invention resides in the homogenization of the electrolyte bath which can be achieved therewith in the relatively inaccessible spaces between opposite electrodes. In respect of such homogenization or mixing, the gas bubbles produced with the cathode of the invention replace the hydrogen liberated at the cathode in non-depolarizing cathodes and which hydrogen is suppressed in the depolarizing cathodes of the prior art. Homogenization of the bath, which is very important for a proper operation of the process of electrolysis, is thus re-established with the cathode of the invention. The agitation of the bath produced by these bubbles can moreover be controlled by control of the air supplied to and withdrawn from the cathode of the invention.

Another advantage of the cathode of the invention resides in the facility with which that cathode can be emptied and cleaned in the event that it should be filled or impregnated with electrolyte as a result of an accidental interruption in the flow of the depolarizing gas. The electrode having in general no affinity for water, a washing and a rinsing with fresh water usually suffice to restore it to operating condition. The electrode of the invention, provided at its upper end with means for introducing water under pressure to the lower part of the central cavity, makes it possible to effect such washing and rinsing under very favorable circumstances and without removing the electrode from operating position. Air is first injected to expel the electrolyte through the calibrated holes at the low end of the electrolyte. After adjustment of the valve for escape of air at the upper end, the cathode is then filled with water in its interior compartment and this water in turn is expelled by means of compressed air. This operation is repeated as often as necessary whereupon the air escape valve is restored to its initial setting for return of the electrode to service.

If the electrolyte has been allowed to rest for a long time inside the cathode so that crystals thereof may obstruct the holes 3, the electrolyte may be first siphoned out and then replaced with pure water to dissolve out the crystals. This process makes it possible to clean the cathode without removing it.

A particular example of the cathode of the invention will now be described as employed in the manufacture of sodium chlorate.

In this cathode, the plates 1 were made of fritted silver, having dimensions of 80 x 80 x 3 mm. Plates of these dimensions were assembled onto a frame of brass soldered with tin and covered with acrylic resin, to form a box-like structure 820 mm. high and 250 mm. wide. The lower cap included on each of the working vertical sides of the electrode three holes of 0.1 mm. diameter. This cathode was operated at a current density of 0.04 amperes per square centimeter in a cell having graphite anodes and an aqueous electrolyte of density 1.33 and of the following composition:

|  | Gms./liter |
|---|---|
| $NaClO_3$ | 400 |
| $NaCl$ | 135 |
| $Na_2Cr_2O_7$ | 7.5 |
| $NaClO$ | 2.7 |

Measurements were made of the electrode or "polarization" potential at the upper and lower ends of the cathode (i.e. at the upper and lower ends of the assemblage of fritted silver plates), of the terminal voltage of the cell, of the air pressure in the cathode cavity, and of the rate of flow of air through it. Another cathode, identical with that of the invention just described but without holes through the lower cap was then operated under the same conditions, and the same measurements were made. The following table records the values so obtained.

In the cathode of the invention, the mixing or stirring resulting from the injection of air into the lower part of the cathode effects homogenization of the electrolyte. The superiority of the cathode of the invention is shown by the reduction in terminal voltage of the cell. Another advantage resulting from the homogenization is the increase in the Faraday yield. That is to say, homogenization reduces the side reactions in which, without homogenization, part of the current sent through the cell is expended. As between a cell wherein the electrolyte is agitated or stirred and one in which it is not, the agitated cell commonly requires for the same useful electrolytic effect a quantity of electricity five percent smaller than the cell without agitation.

The merit of the cathode of the specific example above described, and hence the merit of the cathode of the invention, was further demonstrated in an experiment in which that cathode was flooded and the supply of air thereto interrupted for ten minutes. When the air supply was cut off, the electrolyte entered the lower cavity and filled it almost completely. At the end of ten minutes air was injected at a pressure of 500 grams/cm.$^2$. The cavity of the electrode was emptied in eleven minutes and, three minutes later, bubbles of air were observed to emerge through the calibrated holes in the lower cap thereof. The cathode continued to function satisfactorily with air supplied at a rate of 120 liters/hr. and a pressure of 330 grams/cm.$^2$.

It will thus be seen that the invention provides a depolarizing cathode comprising means which define a substantially closed vessel having a hollow cavity therein, the walls of the vessel being at least in part of a porous, electrically conducting material, and a plurality of apertures being provided in the lower part of the vessel to give access between the interior and exterior thereof. These apertures are large in comparison to the pores in the porous walls of the vessel. In a preferred embodiment of the cathode of the invention, this closed vessel is made up of a plurality of porous plates joined together into a tubular or cylindrical, i.e. annular shape, and of upper and lower caps which effect substantial closure, at the upper and lower ends thereof, of the ring made up of those plates. The apertures are formed in the lower cap, and desirably terminate at their outer ends radially inward of the outer limits of the ring or tube, so that bubbles of gas emerging through those apertures will pass upward along the sides of the tube in rising to the surface of an electrolyte bath in which the cathode is immersed in use. The apertures are preferably distributed in substantially uniform fashion about the axis of symmetry of the cathode, which is vertical when the cathode is in use. The cathode of the invention preferably includes separate conduits for the supply of gas under pressure to the cavity and for withdrawal of gas therefrom, and it also advantageously includes a conduit for the supply of liquid to and its withdrawal from the cavity, in order to permit flushing or washing of the cathode and also the withdrawal of electrolyte which may have penetrated to the interior of the cavity.

While the invention has been described herein in terms of a number of preferred embodiments, the invention itself is not limited thereto; rather, the invention comprehends all modifications on and departures from those embodiments properly falling within the spirit and scope of the appended claims.

We claim:

1. A depolarizing cathode which comprises means defining a substantially closed vessel having a hollow cavity therein and having a porous electrically conductive wall over the major portion of the external surface of the vessel, means for feeding an oxidizing gas under pressure

|  | Air pressure inside cathode | Rate of supply of air to cathode | Electrode potential at upper end of cathode | Electrode potential at lower end of cathode | Terminal voltage of cell |
|---|---|---|---|---|---|
| Cathode of the invention | 300 gms./cm.$^2$ | 112 liters/hr | 855 mv | 955 mv | 2.7 volts. |
| Cathode without holes through lower cap. | 300 gms./cm.$^2$ | 100 liters/hr | 830 mv | 930 mv | 3.15 volts. | into said hollow cavity, means for controlling gas pressure in said hollow cavity, and a cap attached to the lower end of said cathode substantially closing the lower end of the hollow cavity, said cap having a plurality of apertures therein for discharging the oxidizing gas therefrom.

2. A depolarizing cathode according to claim 1 in which the cap is of a conical shape.

3. A depolarizing cathode according to claim 2 wherein said means to define a substantially closed vessel comprise a plurality of porous plates joined together into a ring and an upper cap to effect substantial closure of said ring at the upper end thereof.

4. A depolarizing cathode according to claim 3 further including inlet and outlet gas conduits leading through said upper cap to said cavity.

5. A depolarizing cathode according to claim 4 further comprising a conduit leading into said cavity for the supply and withdrawal of liquid to and from said cavity.

References Cited

UNITED STATES PATENTS

| | | | |
|---|---|---|---|
| 2,273,797 | 2/1942 | Heise et al. | 204—1.06 |
| 2,373,320 | 4/1945 | Lovell et al. | 204—284 XR |
| 2,415,494 | 2/1947 | Holden | 204—284 XR |
| 2,773,025 | 12/1956 | Ricks et al. | 204—284 XR |
| 3,058,895 | 10/1962 | Williams | 204—284 XR |

FOREIGN PATENTS 701,506    1/1965    Canada.

JOHN H. MACK, Primary Examiner

S. S. KANTER, Assistant Examiner

U.S. Cl. X.R.

204—277